United States Patent [19]

Liu

[11] Patent Number: 4,604,423
[45] Date of Patent: * Aug. 5, 1986

[54] COMPOSITION

[75] Inventor: Ping Y. Liu, Naperville, Ill.

[73] Assignee: General Electric Company, Mt. Vernon, Ind.

[*] Notice: The portion of the term of this patent subsequent to Aug. 20, 2002 has been disclaimed.

[21] Appl. No.: 672,718

[22] Filed: Nov. 19, 1984

Related U.S. Application Data

[63] Continuation-in-part of Ser. No. 563,183, Dec. 19, 1983, Pat. No. 4,536,538.

[51] Int. Cl.$^4$ .............................................. C08L 69/00
[52] U.S. Cl. .................................... 524/508; 525/148; 525/133
[58] Field of Search ................ 525/148, 439, 67, 133; 524/508, 513

[56] References Cited

U.S. PATENT DOCUMENTS

| | | | |
|---|---|---|---|
| 3,431,224 | 3/1969 | Goldblum | 525/148 |
| 3,578,729 | 5/1971 | Brinkmann | 525/176 |
| 4,124,652 | 11/1978 | Quinn | 528/346 |
| 4,125,572 | 11/1978 | Scott | 528/307 |
| 4,188,314 | 2/1980 | Fox | 525/433 |
| 4,226,950 | 10/1980 | Holub | 525/67 |
| 4,267,096 | 5/1981 | Bussink | 525/67 |
| 4,391,954 | 7/1983 | Scott | 525/439 |
| 4,536,538 | 8/1985 | Liu | 524/508 |

Primary Examiner—John C. Bleutge
Assistant Examiner—Patricia A. Short
Attorney, Agent, or Firm—Martin B. Barancik

[57] ABSTRACT

A composition comprising
a. a major amount of an aromatic polycarbonate;
b. a minor amount of an impact modified comprising
  (i) an amorphous polyester comprising units derived from 1,4-cyclohexane dimethanol and aromatic dicarboxylic acid or ester forming derivative; and
  (ii) an olefin acrylate polymeric resin;
the components (i) and (ii) in such quantities that said composition has the following properties
  (a) thick section notched Izod impact resistance better than a,
  (b) compatibility as measured by Izod impact resistance of a part made from a double gated mold better than that for a+b (i) or a+b (ii); and
  (c) better resistance against basic organic solution as measured by notched Izod in thin section than a+b (i); and
  (d) a flexural property and heat strength improving quantity of glass fiber which additionally maintains the ductility of (a) and (b) under notched Izod impact testing before and after aging in a basic organic solution.

18 Claims, No Drawings

COMPOSITION

RELATIONSHIP TO ANOTHER APPLICATION

This application is a continuation-in-part of my copending application Ser. No. 563.183, filed Dec. 19, 1983, now Pat. No. 4,536,538.

BACKGROUND OF THE INVENTION

The addition of fibrous materials, such as glass fibers, to polymeric materials is known to increase flexural properties such as yield and modulus as well as the heat strength, commonly measured as Distortion Temperature Under Load (DTUL). However, a trade-off of properties occurs. Many polymers such as polycarbonate are significantly embrittled.

It has now been found that glass fibers can be added to a composition comprising primarily polycarbonate without embrittlement as measured by a notched Izod test system.

DESCRIPTION OF THE INVENTION

In accordance with the invention, there is a composition comprising
a. a major amount of an aromatic polycarbonate;
b. a minor amount of an impact modifier comprising
   (i) an amorphous polyester comprising units derived from 1,4-cyclohexane dimethanol and aromatic dicarboxylic acid or ester forming derivative; and
   (ii) an olefin acrylate polymeric resin;
   the components (i) and (ii) in such quantities that said composition has the following properties
      (a) thick section notched Izod impact resistance better than a,
      (b) compatibility as measured by Izod impact resistance of a part made from a double gated mold better than that for a+b(i) or a+b(ii); and
      (c) better resistance against basic organic solution as measured by notched Izod in thin section than a+b(i); and
      (d) a flexural property and heat strength improving quantity of glass fiber which additionally maintains the ductility of (a) and (b) under notched Izod impact testing before and after aging in a basic organic solution.

The aromatic polycarbonate may be prepared by reacting a dihydric phenol with a carbonate precursor, such as phosgene, a haloformate or a carbonate ester. Generally speaking, such carbonate polymers may be typified as possessing recurring structural units of the formula:

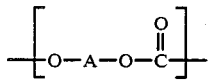

I.

wherein A is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.00 dl/g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are:
2,2-bis(4-hydroxyphenyl)propane;
hydroquinone;
resorcinol;
2,2-bis-(4-hydroxyphenyl)pentane;
2,4'-(dihydroxydiphenyl)methane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2-dihydroxydiphenyl;
2,6-dihydroxynaphthalene;
bis-(4-hydroxydiphenyl)sulfone;
bis-(3,5-diethyl-4-hydroxyphenyl)sulfone;
2,2-bis-(3,5-dimethyl-4-hydroxyphenyl)propane;
2,4'-dihydroxydiphenyl sulfone;
5'-chloro-2,4'-dihydroxydiphenyl sulfone;
bis-(4-hydroxyphenyl)diphenyl sulfone;
4,4'-dihydroxydiphenyl ether;
4,4'-dihydroxy-3,3'-dichlorodiphenyl ether;
4,4'-dihydroxy-2,5-dihydroxydiphenyl ether; and the like.

Other dihydric phenols which are also suitable for use in the preparation of the above polycarbonates are disclosed in U.S. Pat. Nos. 2,999,835; 3,028,365; 3,334,154; and 4,131,575.

These aromatic polycarbonates can be manufactured by known processes, such as, for example and as mentioned above, by reacting a dihydric phenol with a carbonate precursor, such as phosgene, in accordance with methods set forth in the above-cited literature and U.S. Pat. Nos. 4,018,750 and 4,123,436, or by transesterification processes such as are disclosed in U.S. Pat. No. 3,153,008, as well as other processes known to those skilled in the art.

It is possible to employ two or more different dihydric phenols or a copolymer of a dihydric phenol with a glycol or with a hydroxy or acid terminated polyester or with a dibasic acid in the event a carbonate copolymer or interpolymer rather than a homopolymer is desired for use in the preparation of the polycarbonate mixtures of the invention. Branched polycarbonates are also useful, such as are described in U.S. Pat. No. 4,001,184, also there can be utilized blends of a linear polycarbonate and a branched polycarbonate. Moreover, blends of any of the above materials may be employed in the practice of this invention to provide the aromatic polycarbonate. In any event, the preferred aromatic carbonate polymer for use as component (a) (i) herein is a homopolymer derived from 2,2-bis(4-hydroxylphenyl)propane (bisphenol-A).

The amorphous copolyester employed is one comprising units from 1,4-cyclohexane dimethanol and aromatic dicarboxylic acid or ester forming derivatives thereof. Ester forming derivatives include simple esters of acids such as methyl and ethyl and acid halides such as chloro and bromo. Examples of such dicarboxylic acids include phthalic acid, isophthalic acid, terephthalic acid, naphthalenic dicarboxylic acids, biphenyl dicarboxylic acids and the like. The aromatic ring(s) can be substituted with one or more essentially inert groups such as halogen, that is including chloro and bromo and monovalent hydrocarbyl groups such as alkyl of one to eight carbon atoms, inclusive and cycloaliphatic of five to seven carbon atoms, inclusive. Terephthalic acid, isophthalic acid or inertly substituted terephthalic and isophthalic acids are preferred. Mixtures of these two acids are also preferred. An example of a commercial polymer having isophthalate, terephthalate and 1,4-cyclohexane dimethanol residues is Kodar A150 ® available from Eastman Chemical.

1,4-Cyclohexane dimethanol need not be the only glycol present in the polymer. Alkylene glycols from about two to six carbon atoms may also be present in the amorphous polyester. The preferred alkylene glycol is ethylene glycol. Generally, the molar ratio of the 1,4-cyclohexane dimethanol to alkylene glycol, preferably ethylene glycol in the glycol portion of the polymer is from about 4:1 to 1:4. The acid portion preferably comprises terephthalate units, isophthalate units or mixtures of the two.

The amorphous polyester may be prepared by procedures well known to those skilled in this art, such as by condensation reactions substantially as shown and described in U.S. Pat. No. 2,901,466. More particularly, the acid or mixture of acids or alkyl esters of the aromatic dicarboxylic acid or acids, for example dimethylterephthalate, together with the dihydric alcohols are charged to a flask and heated to temperatures sufficient to cause condensation of the copolymer to begin, for example 175°–225° C. Thereafter the temperature is raised to about 250° to 300° C., and a vacuum is applied and the condensation reaction is allowed to proceed until substantially complete.

The condensation reaction may be facilitated by the use of a catalyst, with the choice of catalyst being determined by the nature of the reactants. The various catalysts for use herein are very well known in the art and are too numerous to mention individually. Generally, however, when an alkyl ester of the dicarboxylic acid compound is employed, an ester interchange type of catalyst is preferred, such as NaH Ti(OC$_4$H$_9$)$_6$ in n-butanol. If a free acid is being reacted with the free glycols, a catalyst is generally not added until after the preliminary condensation is under way.

The reaction is generally begun in the presence of an excess of glycols and initially involves heating to a temperature sufficient to cause a preliminary condensation followed by the evaporation of excess glycol. The entire reaction is conducted with agitation under an inert atmosphere. The temperature can then be advantageously increased with or without the immediate application of a vacuum. As the temperature is further increased, the pressure can be advantageously greatly reduced and the condensation allowed to proceed until the desired degree of polymerization is achieved. The product can be considered finished at this stage or it can be subjected to further polymerization in the solid phase in accordance with well known techniques. Thus, the highly monomeric condensation product produced can be cooled, pulverized, and the powder heated to a temperature somewhat less than that employed during the last stage of the molten phase polymerization thereby avoiding coagulation of the solid particles. The solid phase polymerization is conducted until the desired degree of polymerization is achieved. The solid phase polymerization, among other things, results in a higher degree of polymerization without the accompanying degradation which frequently takes place when continuing the last stage of the melt polymerization at a temperature high enough to achieve the desired degree of polymerization. The solid phase process is advantageously conducted with agitation employing an inert atmosphere at either normal atmospheric pressure or under a greatly reduced pressure.

The copolyesters employed for use in the subject invention generally will have an internal viscosity of at least about 0.4 dl./gm. as measured in 60/40 phenol/tetrachloroethane or other similar solvent at about 25° C. and will have a heat distortion temperature of from about 60° C. to 70° C. When a unit derived from an alkylene glycol is also in the polyester, the relative amounts of the 1,4-cyclohexanedimethanol to alkylene glycol preferably ethylene glycol in the glycol portion may vary so long as the molar ratio of 1,4-cyclohexanedimethanol to alkylene glycol is from about 1:4 to 4:1, in order to provide a polyester copolymer having suitable properties.

A copolyester having ethylene glycol units for use as the amorphous polyester copolymer component in the subject invention is a copolyester as described above wherein the glycol portion has a predominance of ethylene glycol over 1,4-cyclohexanedimethanol, for example greater than 50/50 and especially preferable is about 70 molar ethylene glycol to 30 molar 1,4-cyclohexanedimethanol and the acid portion is terephthalic acid. A preferred copolyester of this type is commercially available under the tradename KODAR PETG 6763 from Eastman Chemical Company. Other preferred polymers are those of cyclohexane dimethanol and terephthalic acid, Kodar PCT and those of cyclohexane dimethanol, predominantly ethylene glycol (minor) and terephthalic acid, Kodar PCTG.

The third polymeric resin, component c of the composition, can vary significantly in structure. In general, any copolymer of olefin and acrylate can be employed.

Acrylates having an ester group of alkyl of one to six carbon atoms, inclusive, or cycloaliphatic of five to seven carbon atoms, inclusive are generally preferred. Alkacrylates which also can be employed are those monomers where alk is alkyl of one to three carbon atoms, inclusive preferably methyl. The ester portion of the alkacrylate has the same scope as the ester portion of the acrylate. The weight percent of acrylate which can be present in the polymer can vary widely but generally minimum quantity of about 10 weight percent is necessary to achieve the desired results. The upper limit is not unduly significant, however it should generally be maintained below about 50 weight percent, preferably below about 40 weight percent. A preferred minimum of acrylate is above about 15 weight percent. Olefins of low molecular weight such as ethylene and propylene are generally copolymerized with the acrylates. However, higher alpha olefins generally from about 4 to about 10 carbon atoms can be employed. Ethylene and propylene are preferred. Ethylene ethylacrylate is the preferred copolymer, the acrylate being about 18 weight percent. This polymer is available from Union Carbide as Bakelite ® DPD 6169.

The quantity of components a, b and glass fiber of the composition will vary significantly and still maintain the necessary functions. A major quantity of aromatic polycarbonate is present in the composition. Generally at least about 60 weight % of a and b is aromatic polycarbonate, preferably at least about 70 weight %. With respect to (b) the overall quantity of b and the proportion of components b(i) and b(ii) in b should be such that the aforementioned functions be accomplished. Generally the minimum quantity of b should be above about 4 weight percent of a and b otherwise the desired functions will not be accomplished to a great extent. It is generally preferred to maintain b in at least 7 weight percent quantities. The weight ratio of b(i) to b(ii) generally varies from about 5:1 to 1:5 and preferably from about 4:1 to 1:4. Ratios of from about 3:1 to 1:1 have been found to be useful.

The glass fiber used should be sufficient to accomplish the functions of raising the DTUL and flexural modulus while retaining ductility upon impact. Generally, quantity of from about 5 to about 40 weight percent of the glass fiber plus a+b are sufficient. Preferred quantities are from about 7 to 25 weight percent. The glass fiber which can be used are not critical but are standard glass fibers such as OCF415BB, Owens-Corning Fiberglass Corp., Toledo, Ohio. The E-type glass, K-filament (diameter 12.5 to 14 micron) chopped oven in ⅛" to 3/16" in length.

Various other materials found in thermoplastic, particularly polycarbonate compositions can also be present in the composition of this invention for their usual purpose. These materials include thermal stabilizers such as phosphites and the like, hydrolytic stabilizers such as epoxide and the like, mold release agents such as carboxylic acid esters and the like, fillers such as treated clays, and flame retardants such as organic sulfonic acid salts and the like.

The examples below are illustrative of the inventive concept. They are intended to exemplify the general concept of the invention rather than unduly narrow it.

EXAMPLE

Aromatic polycarbonate prepared from bisphenol-A and phosgene and having an intrinsic viscosity of 0.46–0.49 at 25° C. in methylene chloride was employed in all the compositions. Component b(i), the amorphous polyester is Kodar A150 ® obtained from Eastman Chemical. This polyester is prepared from 1,4-cyclohexane dimethanol and has isophthalate and terephthalate units. Component b(ii) is the ethylene ethyl acrylate obtained from Union Carbide as Bakelite ® DPD6169. Glass fiber OCF415BB is obtained from Owens-Corning Fiberglass Corp., Toledo, Ohio. This polymer is approximately 18 weight percent ethyl acrylate. The components of the formulation were mixed and extruded between about 260°–285° C. Parts are molded at about 265°–290° C. Izod bars of 3.2 mm and 6.4 mm thickness are prepared and tested for impact strength under ASTM D256. A completely ductile break was observed unless otherwise noted by superscript. To test for basic organic solvent resistance, 3.2 mm izod bars are placed on a jig with 2000 psi stress and soaked in a 70° C. preheated Optikleen ® solution diluted with water in a 50:50 volume ratio. Optikleen ® is a blue colored windshield washing solution available from General Motors. It comprises a major quantity of methanol, a minor amount of water and a hydroxyalkylamine. After soaking for two hours, the bar is removed, dried overnight, notched and tested for impact resistance in accordance with ASTM D256.

Below are the test results for the various formulations. Notched Izod unit dimensions are in kg.f cm/cm. "Optikleen ®" is abbreviated as "Opti".

EXAMPLE 1

The effect of glass is demonstrated on bisphenol-A polycarbonate alone.

| | COMPONENT WT. % | | IMPACT STRENGTH | | |
| | POLYCAR- | | | 3.2 mm | |
| SAMPLE | BONATE | GLASS | 6.4 mm | AS IS | OPTI |
| --- | --- | --- | --- | --- | --- |
| A | 100 | 0 | 11° | 88 | breaks |
| B | 90 | 10 | 12.5° | 16.9° | 16.9° |
| C | 80 | 20 | 9.8° | 15.2° | 13.6° |

As is observed, the glass fiber has a decidedly negative effect on impact values of polycarbonate. While the 6.4 mm value essentially shows no change since the thickness is already past the critical thickness of a glassy polymer and the resin is embrittled already, the 3.2 mm values show a substantial decrease in break values (as is) and a total change in failure mechanism from completely ductile to completely brittle. After soaking in Optikleen, the formulations with glass exhibit a low impact value, as opposed to spontaneous breakage of the polycarbonate without fibrous glass reinforcement.

EXAMPLE 2

The formulation having a, b(i) and b(ii) are prepared with and without glass and tested as in the Example 1 and also for flexural properties according to ASTM D790, and DTUL according to ASTM D648. Below are the results.

| | COMPONENTS WT. % | | | | FLEXURAL PROPERTY | | | IMPACT | | | |
| | | | | | YIELD | MODULUS | DTUL | 6.4 mm | | 3.2 mm | |
| SAMPLE | a | b(i) | b(ii) | GLASS | kg/cm² | kg/cm² | °C. | AS IS | OPTI | AS IS | OPTI |
| --- | --- | --- | --- | --- | --- | --- | --- | --- | --- | --- | --- |
| D | 85 | 10 | 5 | 0 | 920 | 21500 | 123 | 59.3 | 43.5 | 89.8 | 83.3 |
| E | 76.5 | 9.0 | 4.5 | 10 | 920 | 27000 | 125 | 15.5 | 10.9 | 22.3 | 22.3 |
| F | 68 | 8 | 4 | 20 | 910 | 34500 | 127 | 15.5 | 10.9 | 20.7 | 20.7 |

The addition of both 10 and 20 weight percent glass to the formulations bring about increased flexural modulus and DTUL. However the expected significant decrease in impact strength at break and the change in failure mechanism from ductile to brittle is not observed. Rather, the impact strength at break remains essentially the same. The failure mechanism also remains ductile.

What is claimed is:

1. A composition comprising
    a. a major amount of an aromatic polycarbonate;
    b. a minor amount of an impact modifier comprising
        (i) an amorphous polyester comprising units derived from 1,4-cyclohexane dimethanol and aromatic dicarboxylic acid or ester forming derivative; and
        (ii) an olefin acrylate polymeric resin;
    the components (i) and (ii) in such quantities that said composition has the following properties
        (a) thick section notched Izod impact resistance or ductility at break higher than a,
        (b) double gate Izod impact or ductility at break of a weld line higher than a+b(i) or a+b(ii); and
        (c) higher resistance against basic organic solution as measured by notched Izod impact resistance or ductility at break in thin section than a+b(i); and (d) a flexural property and heat strength improving quantity of glass fiber which additionally maintains the ductility of (a) and (b) under notched Izod impact testing before and after aging in a basic organic solution.

2. The composition in accordance with claim 1 wherein the aromatic polycarbonate is at least about 75 weight percent of a and b.

3. The composition in accordance with claim 1 wherein b is at least about 4 weight percent of a and b.

4. The composition in accordance with claim 2 wherein b is at least about 4 weight percent of a and b.

5. The composition in accordance with claim 4 wherein the amorphous polyester b(i) is made of 1,4-cyclohexane dimethanol units, isophthalate and terephthalate units.

6. The composition in accordance with claim 4 wherein the copolymer b(ii) is made from alpha olefins of two to about ten carbon atoms, inclusive and the acrylate portion is an acrylate ester wherein the ester group is alkyl of one to six carbon atoms, inclusive.

7. The composition in accordance with claim 5 wherein the copolymer b(ii) is made from alpha olefins of two to about ten carbon atoms, inclusive and the acrylate portion is an acrylate ester wherein the ester group is alkyl of one to six carbon atoms, inclusive.

8. The composition in accordance with claim 7 wherein b(ii) is ethylene ethylacrylate.

9. The composition in accordance with claim 8 wherein the impact modifier b is at least about 8 weight percent.

10. The composition in accordance with claim 9 wherein b(i) is at least about 4 weight percent and b(ii) is at least about 4 weight percent.

11. The composition in accordance with claim 4 wherein the aromatic polycarbonate is bisphenol A polycarbonate.

12. The composition in accordance with claim 5 wherein the aromatic polycarbonate is bisphenol A polycarbonate.

13. The composition in accordance with claim 6 wherein the aromatic polycarbonate is bisphenol A polycarbonate.

14. The composition in accordance with claim 7 wherein the aromatic polycarbonate is bisphenol A polycarbonate.

15. The composition in accordance with claim 8 wherein the aromatic polycarbonate is bisphenol A polycarbonate.

16. The composition in accordance with claim 1 wherein the glass fiber is from about 5 to about 40 weight percent of a and b.

17. The composition in accordance with claim 16 wherein the glass fiber is from about 7 to about 25 weight percent of a and b.

18. An article molded from a composition of claim 16.

* * * * *